Jan. 1, 1924 1,479,056
J. T. CUMMINGS ET AL
APPARATUS FOR AND METHOD OF CUTTING METAL
Filed Nov. 12, 1921 10 Sheets-Sheet 1

Inventors
John T. Cummings
Benjamin H. Dawlton
Frank W. Taylor,
Clarence J. Robinson,
By Toulmin & Toulmin
Attorneys

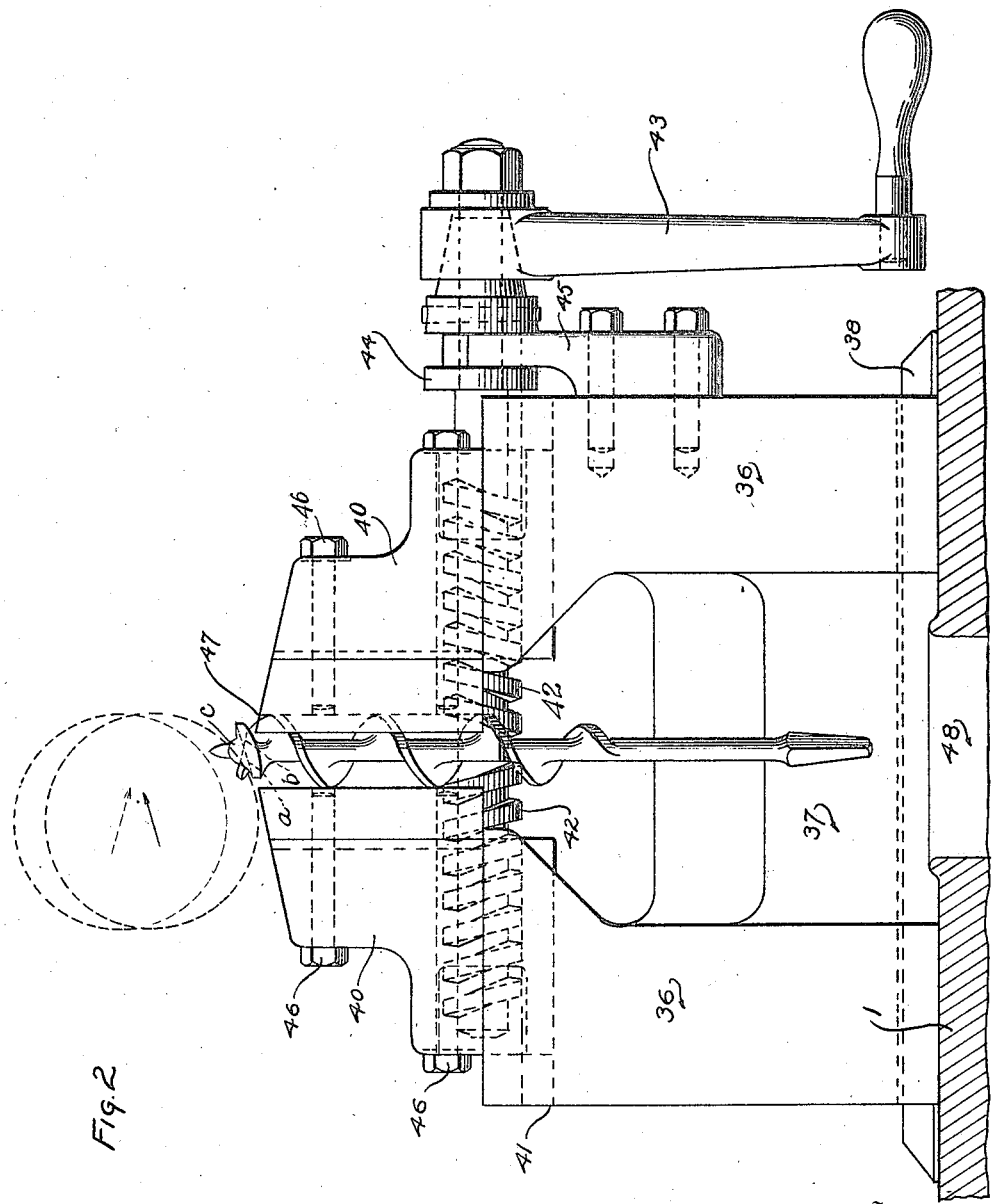

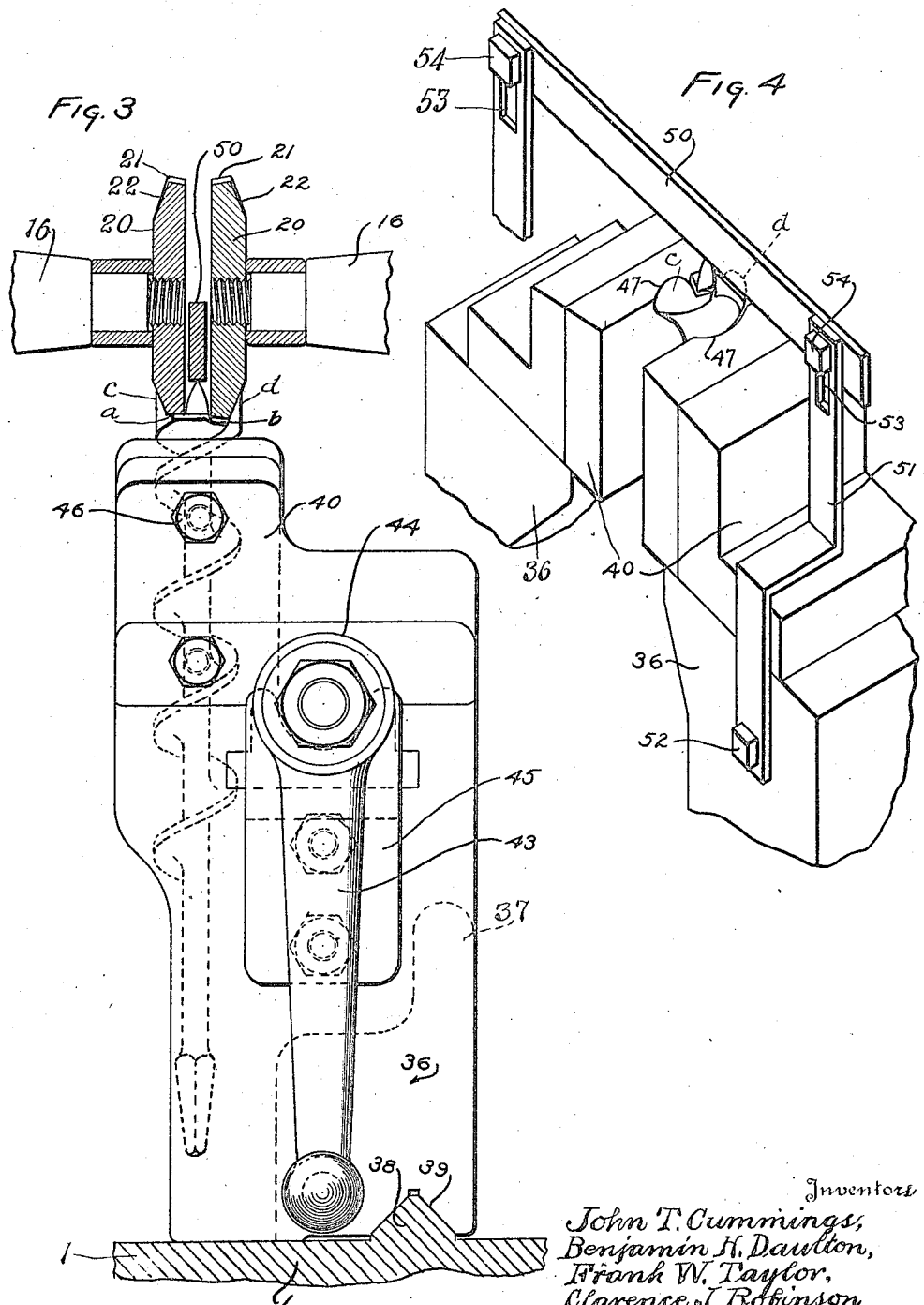

Jan. 1, 1924. 1,479,056
J. T. CUMMINGS ET AL
APPARATUS FOR AND METHOD OF CUTTING METAL
Filed Nov. 12, 1921  10 Sheets-Sheet 4

Inventor
John T. Cummings
Benjamin H. Daulton
Frank W. Taylor
Clarence J. Robinson
By Toulmin & Toulmin
Attorneys

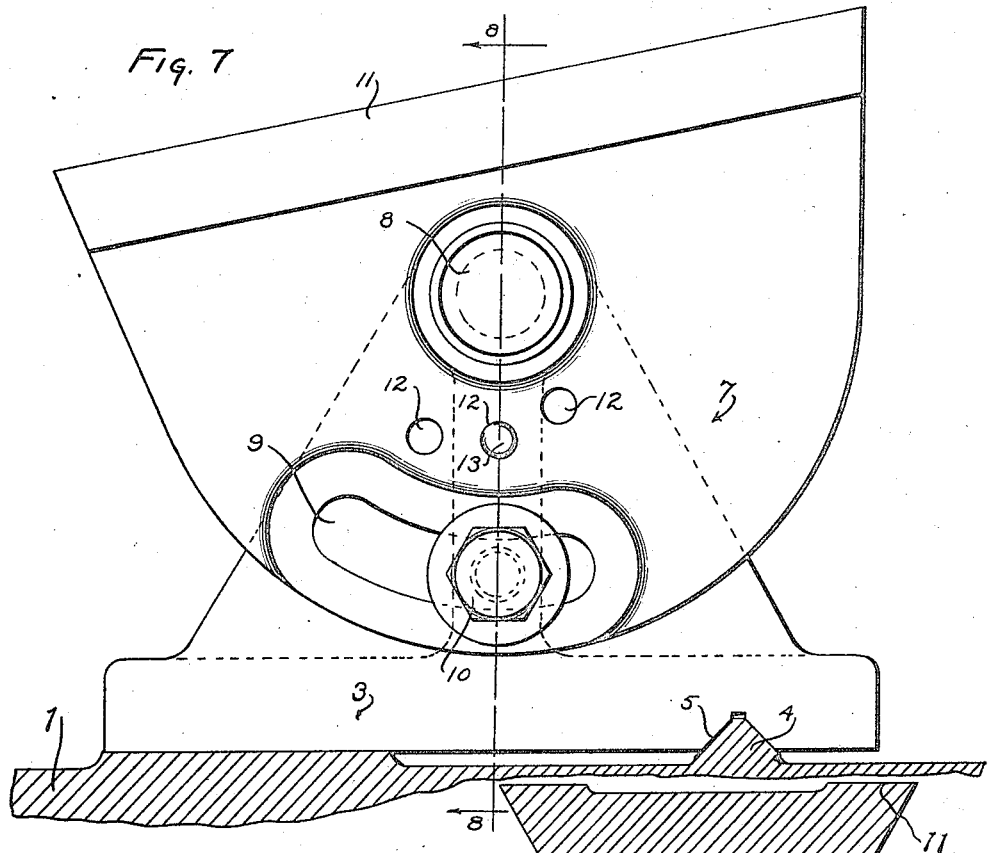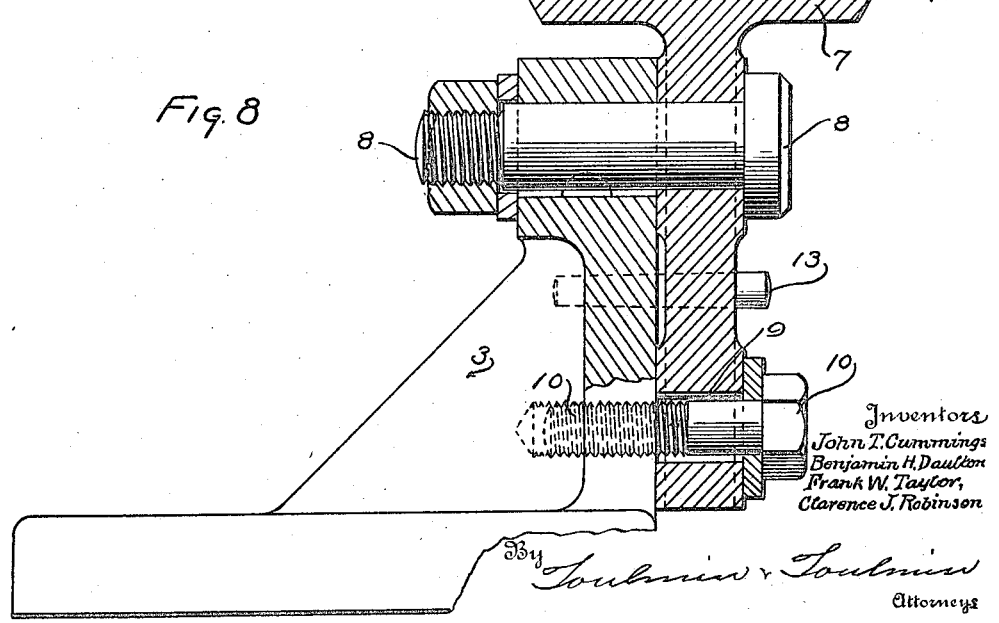

Jan. 1, 1924. 1,479,056
J. T. CUMMINGS ET AL
APPARATUS FOR AND METHOD OF CUTTING METAL
Filed Nov. 12, 1921 10 Sheets-Sheet 6

Inventors
John T. Cummings
Benjamin H. Daulton
Frank W. Taylor
Clarence J. Robinson
By Toulmin & Toulmin
Attorneys

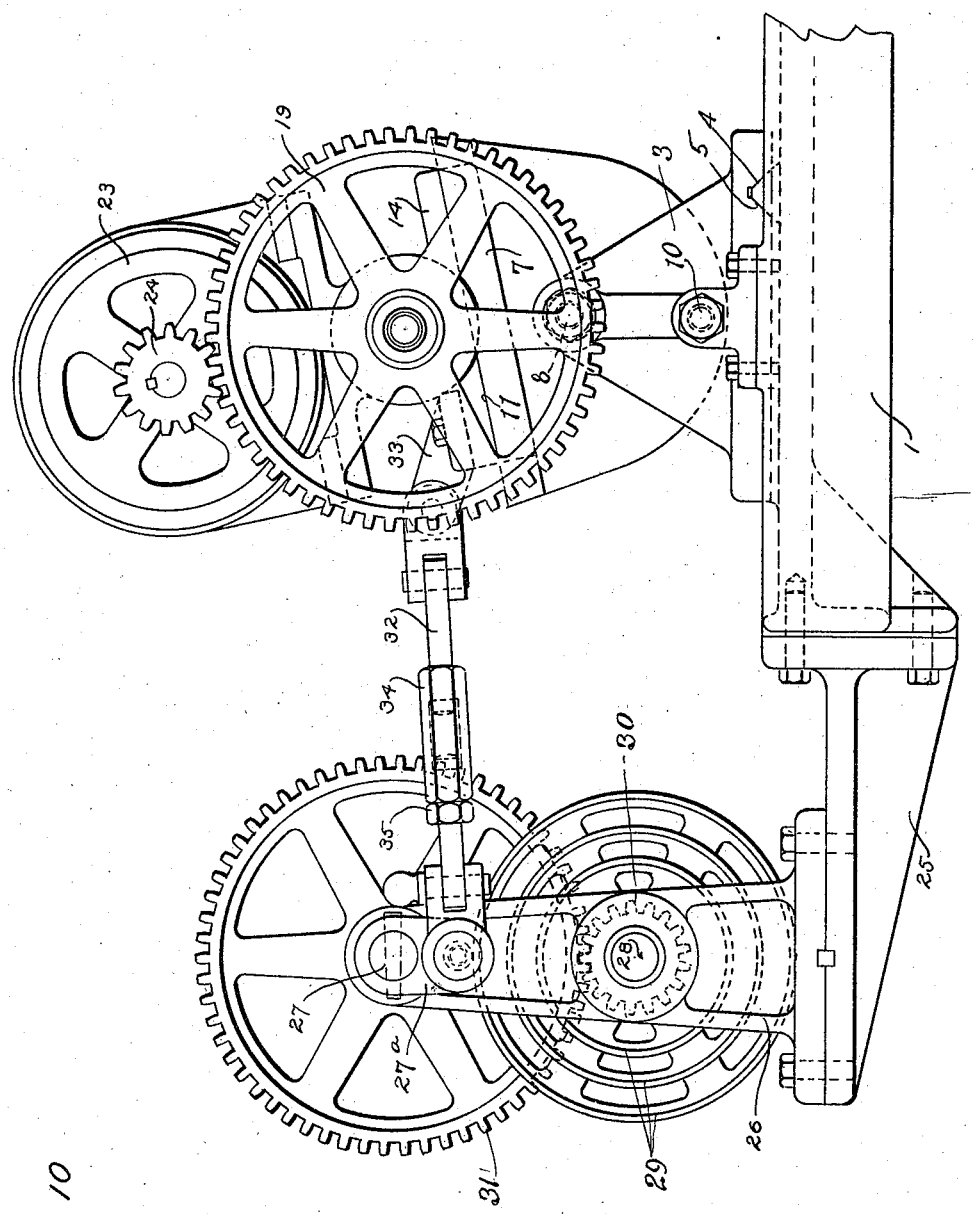

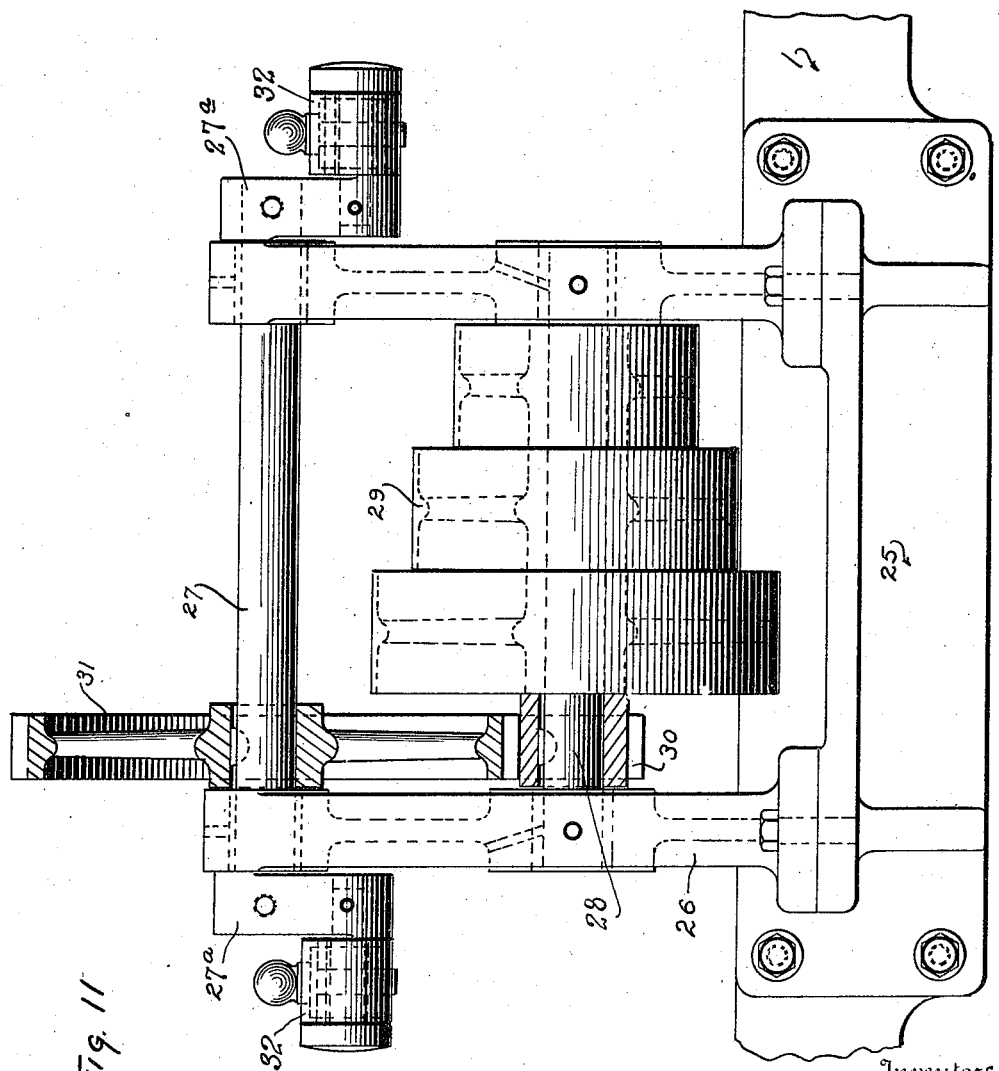

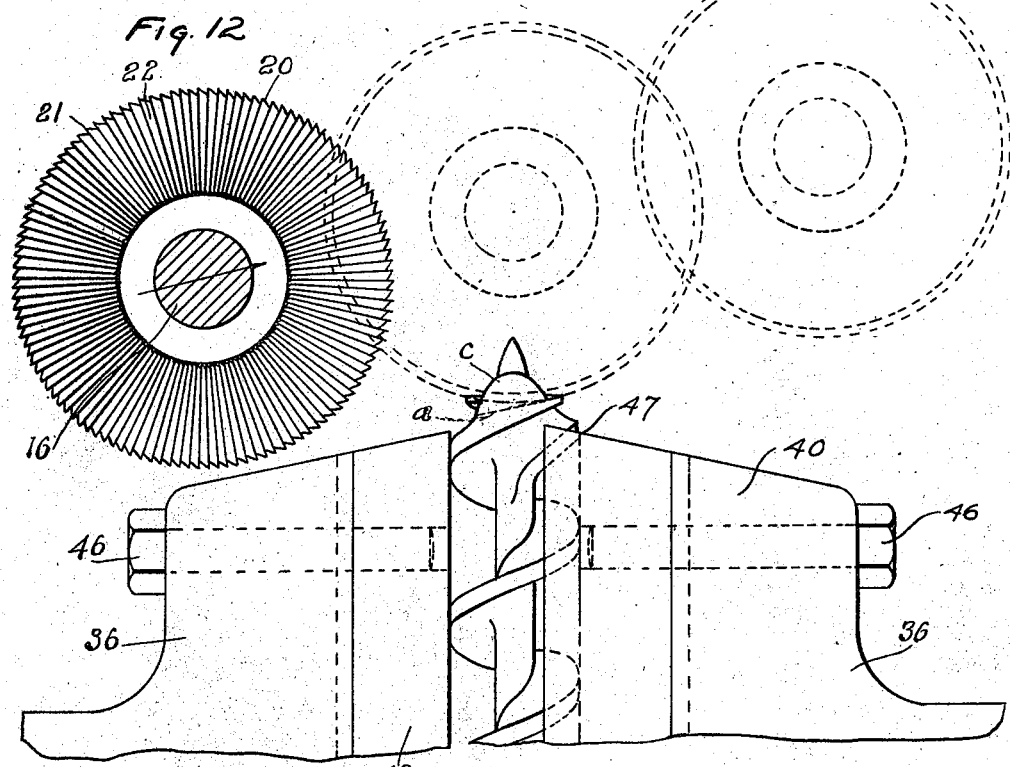
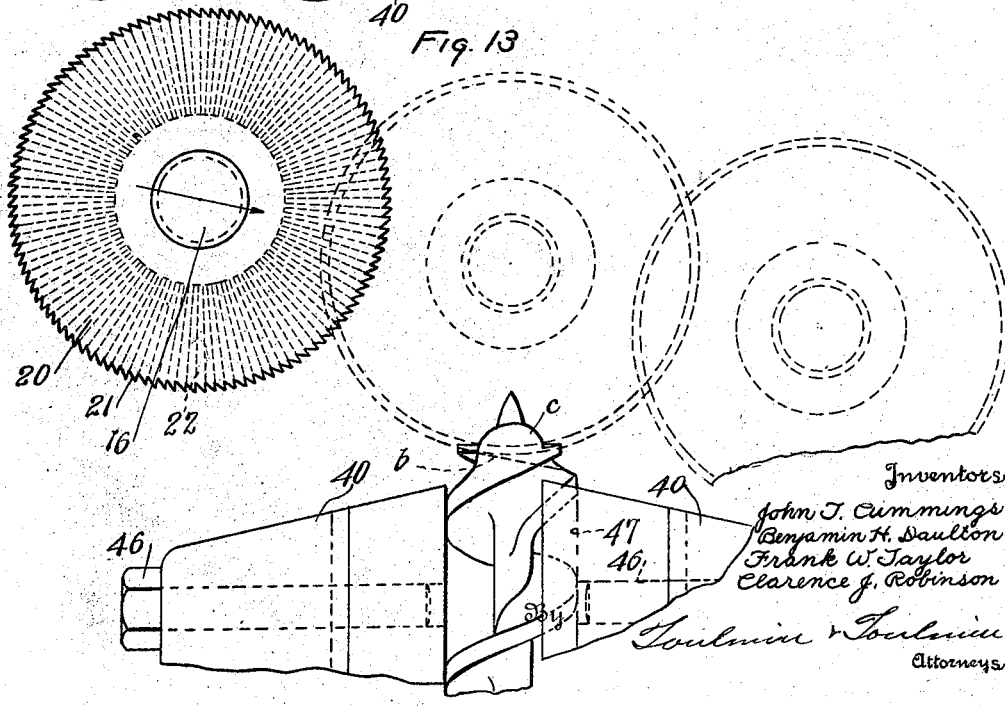

Inventors
John T. Cummings,
Benjamin H. Dawson,
Frank W. Taylor,
Clarence J. Robinson,
By Toulmin & Toulmin
Attorneys Patented Jan. 1, 1924.

1,479,056

UNITED STATES PATENT OFFICE.

JOHN T. CUMMINGS, BENJAMIN H. DAULTON, FRANK W. TAYLOR, AND CLARENCE J. ROBINSON, OF WILMINGTON, OHIO, ASSIGNORS TO THE IRWIN AUGER BIT COMPANY, OF WILMINGTON, OHIO, A CORPORATION OF OHIO.

APPARATUS FOR AND METHOD OF CUTTING METAL.

Application filed November 12, 1921. Serial No. 514,469.

*To all whom it may concern:*

Be it known that we, JOHN T. CUMMINGS, BENJAMIN H. DAULTON, FRANK W. TAYLOR, and CLARENCE J. ROBINSON, citizens of the United States, residing at Wilmington, in the county of Clinton and State of Ohio, have invented certain new and useful Improvements in Apparatus for and Methods of Cutting Metal, of which the following is a specification, reference being had therein to the accompanying drawing.

Our invention relates to an apparatus for, and a method of, cutting metal and other like materials.

In particular it is our object to provide a mechanism for, and a method of manufacturing auger bits. It will be understood, however, that our invention comprehends not only cutting of metals but also grinding, abrading, polishing or otherwise treating and working metals and like materials.

Our invention also has for its object the elimination of hand work in the manufacture of auger bits, eliminating those operations known as spur setting, end milling and top filing. Heretofore it has been the practice, after the bit has been formed by forging from the raw stock to cut away by some suitable instrument the ends of the bits at the different angles required. This has been a tedious operation and a wasteful one because of the difficulty of the operator judging by eye the exact extent of the cut, the angle of the cut and the degree of angularity with respect to other angular cuts taken on the end of the bit. It is also difficult for the operator to properly cut away the metal at the end of the bit adjacent the spurs with any degree of accuracy because all of these operations were performed at the end of the bit away from the operator as the operator held the shank. This placed the end of the bit upon which the operations were taking place out of the line of vision of the operator, so that the operations had to be carried out through instinctive skill rather than by any precision methods. This resulted in the necessity for highly skilled labor and large wastage resulted even by skilled operators, due to bits being advertently ruined.

It is also an object of our invention to provide a mechanism for automatically positioning and finishing the bits operating upon the head thereof. Our machine accomplishes the finishing of the head by cutting away the portions on either side of the screw point, forming the proper angles on the end thereof, and removing the material on the inside of the spurs; and forming the cutters so that all that need be done after this treatment by the machine is to hand file a slight amount to remove any roughness upon the finished product. The machine of our invention provides a limit to the movement of the bit by being operated upon both laterally and vertically so that only a predetermined amount may be removed therefrom at a predetermined angle. It is a further object of our invention to provide for simultaneous operations upon the head at both sides of the screw point.

It is a further object of our invention to provide for the ready adjustment of our cutters so that the angles of cutting may be varied. It is an additional object of our invention to provide for the automatic removal of the bit from engagement with the cutting members and the automatic positioning of the bit when inserted in the position to be worked upon.

In the accompanying drawings, forming a part of this specification:

Fig. 2 is an enlarged detail elevation of the vise by which the bits are held when under treatment;

Fig. 3 is an enlarged end view of the vise and an elevation of the cutters shown in the act of treating the bit;

Fig. 4 is a detail perspective view of the vise, showing also the stop by which the bit is positioned vertically;

Fig. 7 is an enlarged detail view of the bed in section, the standard and the adjustable way for the cutter slide;

Fig. 8 is a sectional view taken on the line 8—8 of Fig. 7;

Fig. 10 is an enlarged elevation of the portion of the bed, the cutter mechanism for rotating it and the mechanism for reciprocating it;

Fig. 11, is an enlarged elevation of the pulleys, gears, and crank shaft and their bearing standards for reciprocating the cutters;

Fig. 12 is an enlarged detail view of the vise and bit therein, and a cutter shown in full lines approaching the bit, in dotted lines completing its cutting operation on the bit, and in other dotted lines at its extreme limit of forward movement, the upward incline of the bit end being under treatment;

Fig. 13 is a like view showing the downward incline of the bit under treatment, the cutter being shown in full lines approaching the bit, in dotted lines entering upon the cutting action, and in other dotted lines in its extreme forward position;

Figure 1:
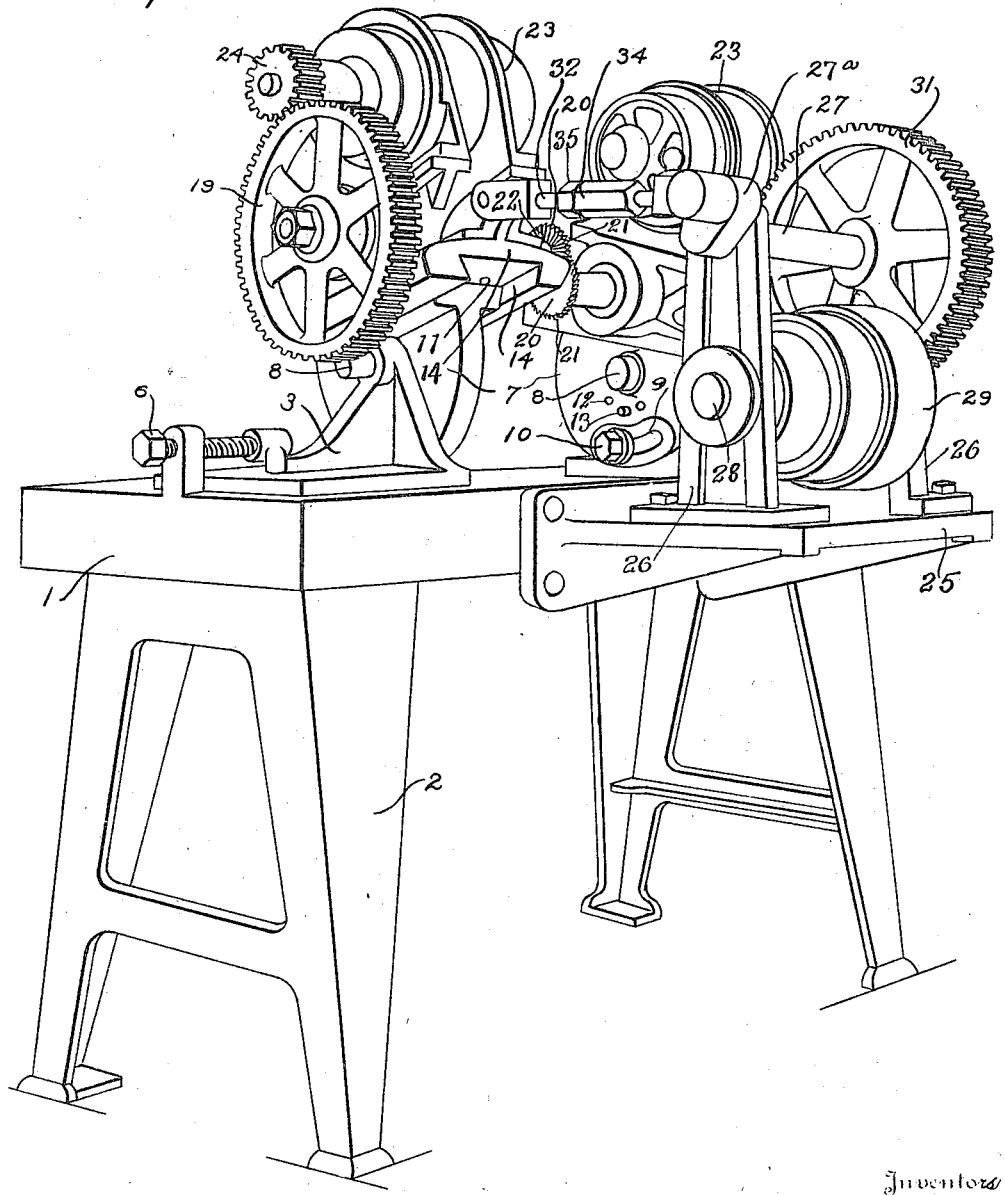
Fig. 1 is a perspective view of our machine looking from a rear corner thereof.
Figure 5:
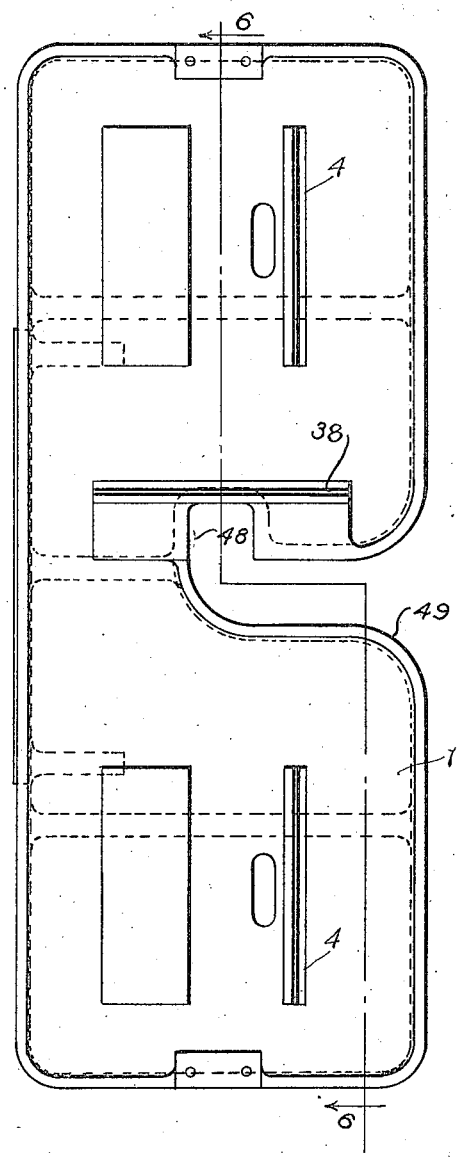
Fig. 5 is a plan view of the bed of the machine.
Figure 6:
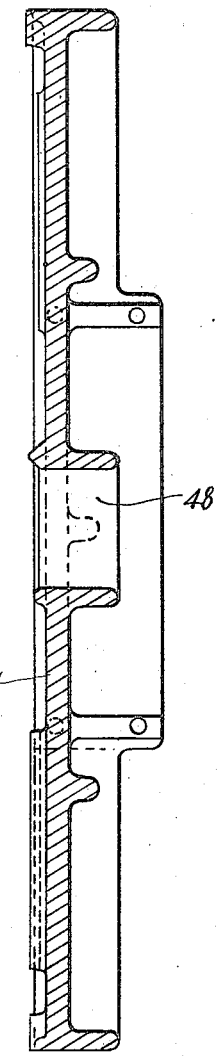
Fig. 6 is a sectional view on the line 6—6 of Fig. 5, showing the bed in section.

We have said that our invention is adapted to perform the various functions of cutting, grinding, abrading and polishing metals and the like. We have also said that these operations may be performed not only on bits but other articles. In the embodiment illustrated in the accompanying drawings we have shown the machine organized for performing the finishing operations on auger bits, and have illustrated one type of apparatus by which our method may be successfully practiced. But it is to be understood that the machine may be varied in detail where other articles than bits are to be treated and in other details, such as in the cutters, where grinding, abrading or polishing is to be done instead of cutting.

In the present embodiment, numeral 1 designates a strong bed mounted upon legs 2. The bed carries standards 3 guided by tracks 4 which fit grooves 5 in the standard. This permits of the adjustment of the standards by adjusting the screws 6 so as to position the opposite standards nearer together or further apart as may be desired.

On each standard is pivotally mounted an adjustable way 7 and shaft 8 constituting the pivot of the way. As best seen in Figs. 7 and 8, it will be noted that the way 7 is slotted at 9 to receive a bolt 10 carried by the standard 3, so that the way may be tilted to any adjustment required to make its edge 11 incline to the degree that the end of the bit is to be inclined, as will more fully appear later. The way has holes 12 into any of which the pin 13 may be inserted as a means of gauging the inclination. The holes 12 are so positioned that when the pin is inserted and extended into the standard, the way will be inclined to the proper degree for the particular work.

Figure 9:
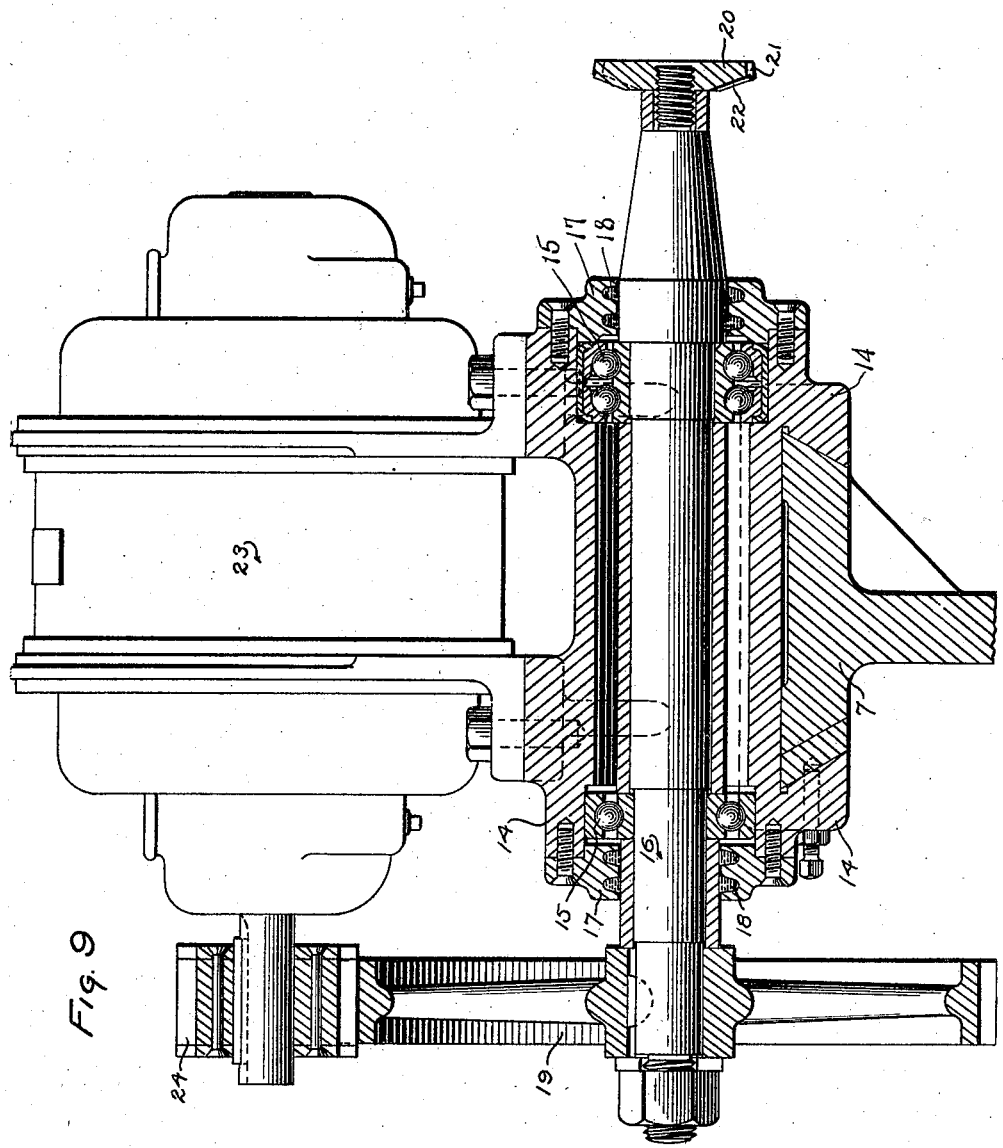
Fig. 9 is a partial section and side elevation of the mechanism comprising the cutter, its mounting and its motor.
Figure 14:
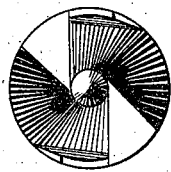
Fig. 14 is an end view of a bit after receiving one operation on the end mill under the old method.
Figure 16:
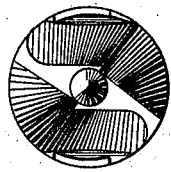
Fig. 16 is an end view of the same bit after receiving the second operation under the old method, showing the "pitched" treatment, meaning the treatment by which the end is given the increased inclines.
Figure 18:
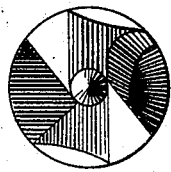
Fig. 18 is an end view of a bit after it is given the third operation under the old method by which the spur has been "set" or finished.
Figure 15:
Fig. 15 is a perspective view of the same.
Figure 17:
Fig. 17 is a perspective view of the same.
Figure 19:
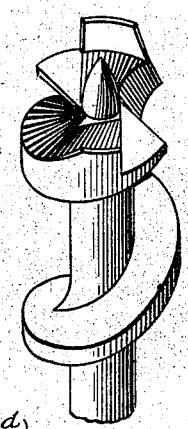
Fig. 19 is a perspective view of the same.

As before intimated, there are two of these standards and ways. On each of them is mounted a cutter slide 14, as best seen in Fig. 9. This slide carries conventional ball bearings 15 for the cutter shaft or arbor 16. End caps 17 have channels 18 for containing lubricant. On the shaft 16 is mounted a driven gear wheel 19 and also, at the other end, a cutter 20 having peripheral teeth 21 to cut the ends of the bits and surface teeth 22 to cut the inner faces of the spurs of the bit blank, as will be more fully explained later.

The slide 14 supports a motor 23, preferably an electric motor, which being so mounted partakes of the sliding motions of the slide as it travels on the way 7. The motor shaft carries a driving pinion 24 which meshes with the gear 19 and thereby imparts rapid rotary motion to the cutter shaft and its cutter when cutters are used or to any suitable grinding, abrading or polishing instrument, according to the work to be done.

It will be observed that a cutting, grinding, abrading or polishing unit is constituted of each adjustable way, its slide, the motor, the gearing, the cutter shaft and the cutter or other instrument. Two of these units are employed. Besides the high rotary motion of the shaft and cutter, the cutting unit is reciprocated as indicated in Fig. 1 and more clearly illustrated in Figs. 10 and 11. One unit travels upwardly in approaching the bit so as to treat one incline of the bit end, as at *a* in Figs. 22 and 23, while the other unit travels downwardly so as to treat the other and reverse incline $b$ of the bit end. See particularly Fig. 12 where the cutter is not only rotating on its own axis through the action of the motor but is traveling upwardly on the incline indicated in Figs. 1 and 10. In the second position of the cutter, as shown in dotted lines in Fig. 12, it has nearly completed its cutting action on the incline $a$ of the bit as also on the inner face of the spur $c$. In the dotted position at the extreme right the cutter has reached its limit of travel and will then return to normal, as will appear later when we describe the means for reciprocating the unit.

And while the above operation of one cutter is taking place as shown in Fig. 12, the other cutter is traveling and operating as indicated in Fig. 13. It will be seen from this figure that the cutter shown in full lines at the left is approaching the bit, and that in the next position shown in dotted lines it is entering upon its cutting action on the downward incline $b$, while in the extreme right position, as also shown in dotted lines, it has reached its limit of travel and is about to return to normal position. In acting on this incline $b$, it also acts on the inner face of the spur $d$.

We may add at this place that it will be noted how our invention, both as to apparatus and method, comprises treating the end of the bit head by instrumentalities which rotate on their own axes and advance across the bit end, the one at an inclination running upwardly from the first point of contact between the instrumentality and the bit and the other downwardly from such first point, so that both head faces are simultaneously and rapidly treated with precision and accuracy; that the inclination of travel of the instrumentalities or cutters may be varied and set to conform to the requirements in the production of different styles and kinds of bits; and that while the end surfaces are being treated, the spurs also are treated in the one operation.

Figure 20:
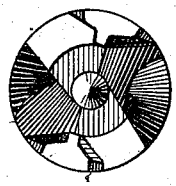
Fig. 20 is an end view of a similar bit as it comes from the different operations and the forging has been treated by our improved present machine and method.
Figure 22:
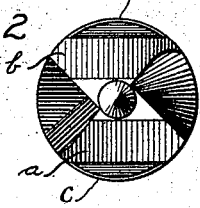
Fig. 22 is an end view of the same bit after it has received the only treatment necessary by our machine and method, which makes it a finished product, converting it from the die-stock shown in Figures 20 and 21 to the finished product.
Figure 21:
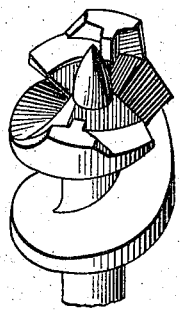
Fig. 21 is a perspective view of the same.
Figure 23:
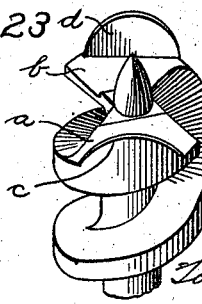
Fig. 23 is a perspective view of the product as shown in Fig. 22.

And it will further be understood that these treatments, or more properly speaking, this one operation, completes the bit, and converts the blank as it comes from the dies or forging operations, in the state illustrated in Figs. 20 and 21, to the product illustrated in Figs. 22 and 23. The only further treatment needed, if any, is the common one of lightly dressing off with a file or other instrument little projections or roughnesses not removable by the polishing operation, which is performed on the completed product to enhance its appearance.

Referring now to the mechanism for imparting the reciprocating motion to the cutting units, it will be seen from Figure 10 that the bed 1 carries a bracket 25 on which is mounted bearing standards 26 affording bearings for a crank shaft 27 and a driving shaft 28. The latter is equipped with a series of driving pulleys 29 which, through a driven belt, rotate the driving shaft and its pinion 30, which meshes with a driven gear 31 on the crank shaft 27. In this way rotary motion is imparted to the crank shaft. The shaft has two cranks $27^a$, preferably so relatively set that one is slightly ahead of the other so that the cutting unit, say the one which treats the upwardly inclined surface of the bit head, will travel slightly in advance of the other cutting unit. This is not essential but has the incidental advantage of starting the operation on one of the bit head surfaces just before the other is commenced.

Referring again to Fig. 10, it will be seen that the crank $27^a$ connects with a pitman 32 which in turn is attached by a bracket 33 to the slide 14 so as to reciprocate the unit. As each crank $27^a$ is so connected both units are reciprocated. A turn buckle 34 may be used to adjust the length of each pitman with nicety, a lock nut 35 being preferably used.

We will now refer to the vise or means by which the bit is held when undergoing treatment. A standard comprised of uprights 36 and a cross member 37 is mounted upon the base 1, as clearly shown in Figs. 2 and 3, preferably in a manner to permit of slight adjustment laterally to the line of movement of the cutting units, so as to delicately position the bits with respect to the cutters, as suggested by observing Fig. 2. This means of adjustment consists of a way or rib 38 on the bed which extends into a groove 39 in the standard 36.

On this standard are mounted adjustable jaws 40, slidably mounted thereon in ways 41. Threaded into the jaws is a right and left hand screw 42 operated by a handle 43, whereby when the screw is rotated the jaws will approach, or separate from, each other to clamp or release a bit as clearly seen in Fig. 2. The screw has collars 44 between which is fitted a forked arm 45 secured to the standard 36. These parts connect the screw with the standard and prevents its longitudinal movement.

Each jaw has a set screw 46 by which to impinge the bit according to which screw the flange or twist of the bit comes opposite. The face of one jaw is also grooved as shown at 47 to receive the twist of the bit, as shown more particularly in Fig. 4.

Thus it will be seen now the bits are readily and strongly secured during the cutting operations. To release them it is only necessary to operate the handle 43 to separate the jaws when the bits automatically drop out and pass through an opening 48 in the bed 1. For the ready insertion of the bits into the vise the bed plate is slotted as seen at 49, the slot leading into the opening 48.

In order to position the bit vertically we provide a suitable stop, in the nature of the bar 50 as seen in Figs. 3 and 4. Slotted strips 51 are secured by nuts and bolts 52 to the standard 36 and support the stop 50. The slots 53 permit of the adjustment up and down of the nuts and bolts 54 by which the stop is connected to the strips. It will be noted that the stop stands over the point of the bit. In this way the bits are positioned vertically at the proper location. Thus by means of the vise and the stop the bits are readily positioned and firmly held and easily released.

The operation of our machine will be readily understood from the foregoing description in which the operation has been more or less fully stated as each part was described. We would further observe, however, that the cutters receive rotary movement about their axes from the motors and an inclined movement transverse to their axes, one cutter moving upwardly across the face of the bit head and the other moving downwardly across the same, while each is rotating rapidly to cut away the rough blank and form finished faces $a$ and $b$ and finished spurs $c$ and $d$ as indicated in Figs. 22 and 23; and further that the cutters reciprocate so that when they have passed, the one upwardly and the other downwardly, to the proper limit they both return on the reverse stroke, so that they are reciprocated as well as rotated, and travel at these opposite inclinations during their reciprocation.

One passage of the cutters from one side to the other of the bit head completes the operation. The bit is then discharged by releasing the vise. And while the cutting units are making their reverse stroke the operator inserts another bit blank which will be ready to receive the cutting operation on the next or succeeding stroke of the cutting units. The operation is rapid and accurate and the product is finished with respect to the completion of the inclined faces and spurs.

Referring now to our method, it will be seen that it consists of the following steps:

$a$. Manually positioning and securing the bit; $b$, simultaneously removing material from the stock at opposite sides of the center on oppositely inclined planes; and, $c$, in cases where spurs are to be formed, in removing the material of the stock in substantially vertical planes adjacent to the inclined planes.

And in a more limited sense our method also includes the manual positioning of the bit, the mechanical clamping of it, the manual releasing of the bit, the gravitating discharge of it, the simultaneous removal of the material of the stock on an inclined plane and a nearly vertical adjoining plane on one side of the bit center, and likewise on the other side in an oppositely inclining plane and an adjacent nearly vertical plane; and further includes the removal of the material by a cutting action performed by a rotating movement.

Having thus fully described our invention, what we claim as new and desire to secure by Letters Patent, is:—

1. In a machine of the character described, the combination with a bed and bit-securing devices, of cutting units comprising a reciprocating rotary element adapted to travel at an incline across the face of a bit head and to remove the material and finish the face.

2. In a machine of the character described, the combination with a bed and bit-securing and positioning devices, a pair of cutting units each adapted to travel across the face of a bit head, one unit at an inclination to the other to remove the stock and produce two oppositely inclined faces.

3. In a machine of the character described, the combination with a bed and bit-securing and positioning devices, of a cutting unit adapted to travel across the face and spur of a bit head and to remove the material to form a finished face and spur, the line of movement being inclined.

4. In a machine of the character described, the combination with a bed and bit-securing and positioning devices, of a pair of cutting units having cutters adapted to rotate and travel at an incline across the face of a bit head, one cutter traveling upwardly and the other downwardly, and both adapted to remove material and leave finished faces and spurs.

5. In a machine of the character described, the combination with a bed and bit-securing and positioning devices, of cutting units each comprised of a way, a slide, a cutter shaft and motor on the slide and intergeared to rotate the cutter, and reciprocating means to operate the slides, the line of movement of one slide being upward and the other downward as the cutters approach and travel across a bit, the cutters being adapted to remove material to form finished faces on the bit head.

6. In a machine of the character described, the combination with a bed and bit-securing and positioning devices, of a pair of cutting units, each comprising an adjustable way, a slide mounted thereon, a cutter shaft mounted on the slide and carrying a cutter, a motor on the slide intergeared with the cutter shaft, a crank shaft, means to rotate it, and a pitman connecting each slide with the crank shaft, whereby the cutters are rotated about their axes and reciprocated to travel across a bit first in one direction and then the other, the cutters being adapted while crossing the bit to remove its material and leave faces on the bit head.

7. In a machine of the character described, the combination with a base, a standard adjustably mounted thereon, an adjustable way pivotally mounted on the standard and adapted to be positioned at different inclinations, a slide mounted on the way, a shaft mounted in the slide and having a cutter at one end and a gear wheel at the other, a high speed motor also mounted on the slide and having a pinion meshing with said gear.

8. The herein described method of treating bits, consisting in securing a bit in fixed position, in simultaneously removing material from the face of the bit head in two oppositely inclined planes by two instrumentalities, each rotating about its own axis, one traveling along one incline and the other along the other.

In testimony whereof, we affix our signatures.

JOHN T. CUMMINGS.
BENJAMIN H. DAULTON.
FRANK W. TAYLOR.
CLARENCE J. ROBINSON.